United States Patent Office 2,929,820
Patented Mar. 22, 1960

2,929,820

CHLORINOLYSIS OF DISULFIDES AND THIOLS WITH SULFURYL CHLORIDE AND A CATALYST

Norman Kharasch, Culver City, Calif., assignor to Stauffer Chemical Company, a corporation of Delaware No Drawing. Application June 5, 1957
Serial No. 663,590

14 Claims. (Cl. 260—306)

This invention relates in general to the synthesis of sulfenyl chlorides and particularly to the chlorinolysis of disulfides and thiols using sulfuryl chloride as a chlorinating agent.

The preparation of sulfenyl chlorides has often been attended with considerable difficulty because of the usual chlorination procedures, wherein the direct action of chlorine upon thiols or disulfides is employed, encounter various complications which make such procedures ineffective. For example, chlorinolysis of the aromatic rings may be encountered. (Cf., Chem. Rev. 39, 269–331 (1946).)

Sulfenyl chlorides are particularly valuable in research work, since certain of them react with a wide variety of compounds to give high yields of excellently crystalline, stable substances of sharp melting points. Therefore, they afford ready means of characterizing many classes of organic compounds. See the article, The Unique Properties of 2,4-dinitrobenzenesulfenyl Chloride in Jour. Chem. Ed., vol. 33, p. 585 (Nov. 1956) by N. Kharasch. Similar reactions make other sulfenyl chlorides of particular value as synthetic intermediates.

It is therefore an object of this invention to provide an advantageous and general method of preparing sulfenyl chlorides from the corresponding thiols and disulfides.

A further object of this invention is to provide certain new chemical compounds, such as pentachlorobenzenesulfenyl chlorides.

Additional objects and advantages of this invention will become apparent during the course of the discussion which follows.

Generally, it has been found that sulfenyl chlorides having the general formula:

ArSCl wherein Ar represents an aryl or substituted aryl group, may be formed by the treatment of certain thiols and disulfides with sulfuryl chloride, $SO_2Cl_2$. It has been further found that this reaction may be accelerated when a tertiary amine such as pyridine, or 2-methyl-5-ethylpyridine, is used as a catalyst. The thiols which are suitable as reactants in the process have the general formula:

ArSH wherein Ar represents an aryl or an aryl-substituted group and the disulfides have the general formula:

$Ar_1SSAr_2$ 

wherein $Ar_1$ and $Ar_2$ are the same or different aryl substituents or substituted aryl substituents. Thus, suitable aryl substituents are phenyl, tolyl, substituted phenyl such as nitrophenyl, 4-chlorophenyl and pentachlorophenyl, as well as more complex groupings such as 2-mercaptobenzothiazole.

More specifically, a reaction between the thiol or disulfide and sulfuryl chloride, to yield the materials of the general formula above, takes place under reflux conditions and in solution as set forth in the examples which follow. Where symmetrical disulfides (bis-aryl) are employed, the quantity of sulfuryl chloride called for will be about twice that required for the thiol. Where thiols are employed, equimolar quantities of the sulfuryl chloride and thiol are needed.

Detailed examples of the process of this invention follow by way of illustration, but are not intended to be limiting other than as is apparent from the claims.

EXAMPLE I

*Preparation of 2-nitrobenzenesulfenyl chloride*

In a 500 ml. flask, equipped with a thermometer and a reflux condenser, was placed 10 g. (.032 mole) of bis-(2-nitrophenyl) disulfide, (melting 170°–183° C. after drying for 10 hours at 98°), 50 ml. of dry carbon tetrachloride, and several drops (less than 0.5 ml.) of dry pyridine. Slowly, with swirling, 3 ml. (5 g.) of sulfuryl chloride (redistilled, boiling 68°–73° C.) was added through the reflux condenser. This caused the color of the reaction mixture to turn from light yellow to dark brown. Using a heating mantle, the temperature was raised to 55° and further heating then stopped. Completion of the reaction required about 30 minutes as indicated by the disappearance of the insoluble yellow disulfide in the brown solution. Activated carbon was added and the mixture filtered through filter aid. The flask was rinsed with 10 ml. of carbon tetrachloride and this filtered through the filter aid. The solvent was aspirated and the product collected. Yield: 12 g. (98% of theoretical) of dark yellow needles; M.P. 69°–70° C.

Ten ml. of sulfuryl chloride, about 400% of theoretical, was also used with equally good results in another run. In other preparations, using no catalyst, the reaction was complete in 3 hours, and the product obtained was about of the same quality. Using two small iodine crystals as catalyst, the reaction was complete in 2 hours. The quality of product was poorer, probably due to contamination by iodine. Using both iodine and pyridine as catalysts, the reaction was complete in about 20–25 minutes. The quality of product was poorer, however, than with only pyridine as a catalyst. In another run, the product was "frozen out" after about half the solvent was aspirated. The golden yellow needles were collected, washed with cold carbon tetrachloride and dried. Yield: 6 g.; M.P. 71°–72° C. Further aspiration gave 6 g. of dark yellowish-brown needles; M.P. 65°–68° C.

EXAMPLE II

*Preparation of pentachlorobenzenesulfenyl chloride* 

20 g. (0.07 mole) of pentachlorobenzenethiol were dissolved in 150 ml. of dry carbon tetrachloride and 3 ml. of dry pyridine were added. The solution was put into a three-neck, round-bottom flask equipped with a condenser, a stirrer, and a dropping funnel. Through the dropping funnel, 7 ml. of redistilled sulfuryl chloride were added over a period of one hour. At the same time the solution was continuously refluxed. After all the sulfuryl chloride was added, refluxing was continued until all the starting material was used up (approximately 45 minutes). The solution was orange in color and some tar was floating on its surface. The solution was filtered and evaporated to approximately half its original volume. The remaining solution was left overnight in the refrigerator. Yellowish-orange crystals appeared, melting at 91–96° C. The product was recrystallized from dry carbon tetrachloride, yielding a beautifully crystalline, bright yellow product. The yield was 19.5 g. (87% of the theoretical yield). The melting point was 91–101° C. The product, pentachlorobenzenesulfenyl 

chloride, was characterized by converting it, quantitatively, to bis(pentachlorophenyl) disulfide (by reaction with pentachlorothiophenol), and by forming the 1:1 adduct (M.P 124°–125° C.) with cyclohexene.

A description for the preparation of pentachlorobenzenesulfenyl chloride on a larger scale follows:

400 g. pentachlorobenzenethiol (95% grade), 2600 ml. of carbon tetrachloride and 60 ml. of pyridine were placed in a five-liter round-bottom flask, fitted with a reflux condenser, a mechanical stirrer and dropping funnel. The mixture was heated to boiling and 140 ml. of sulfuryl chloride was added dropwise over a period of 45 minutes. After the addition of the sulfuryl chloride, the reaction mixture was refluxed for one hour and ten minutes, filtered and the filtrate was allowed to stand overnight. When the volume of the filtrate was reduced to about half and chilled, a fraction weighing 293.7 g. melting 96½°–98° C. was obtained. The volume of the filtrate was again reduced and a fraction weighing 56.3 g. melting at 92–96° C. was obtained. The filtrate was then evaporated to dryness giving a fraction weighing 52 g. and melting at 78½°–82½° C. Considering all three fractions the yield would be 89.4% of the theoretical if the pentachlorobenzenethiol were 100% pure.

EXAMPLE III

*Preparation of 2,4-dinitrobenzenesulfenyl chloride*

In a 2-liter, three-neck flask, fitted with a reflux condenser and a sealed stirrer, was placed 500 g. of bis-(2,4-dinitrophenyl) disulfide, 1200 ml. dry carbon tetrachloride and 10 ml. dry pyridine. 100 ml. of redistilled sulfuryl chloride (B.P. 68–70) was added through the condenser, and the mixture was refluxed on the steam bath. Additional sulfuryl chloride was added in 40 ml. portions every half hour until the reaction was complete as evidenced by the disappearance of the disulfide. Five ml. of pyridine was added every two hours. The total amount of sulfuryl chloride added was 455 ml; total pyridine used was 25 ml. The time to complete the reaction was approximately nine hours.

EXAMPLE IV

*Preparation of 2,4-dinitrobenzenesulfenyl chloride*

25 g. of bis-(2,4-dinitrophenyl) disulfide was suspended in 150 ml. of dry carbon tetrachloride and 3 ml. of pyridine in a 500 ml. flask equipped with a thermometer, a ball and socket stirrer and a reflux condenser. 15 ml. of redistilled sulfuryl chloride (B.P. 68°–70° C.) were added through the condenser and the temperature raised to 60° C. on a steam bath. No cleavage was observed after two hours so the temperature was raised to the boiling point of the solvent and the solution was allowed to reflux. About half an hour after reflux began, an additional 10 ml. of sulfuryl chloride was added. After refluxing for two hours, the reaction was complete except for a small amount of tar floating on the surface. Activated carbon was added and the hot solution filtered through filter aid. The solvent was partially removed by aspiration and the crystals were allowed to come out by leaving the mixture in the refrigerator overnight. Yield: 21.0 g. or 71.5% theoretical; M.P. 95°–96° C.

EXAMPLE V

A second run was made using the procedure set forth in Example IV; this time 100 g. of the disulfide were suspended in 600 ml. of carbon tetrachloride in a one-liter flask. 40 ml. of sulfuryl chloride were added and the mixture was allowed to reflux on the steam bath. 10 ml. portions of sulfuryl chloride were added through the course of the reaction until a total of 90 ml. had been added. 5 ml. of pyridine were added initially, and 1 ml. additional was added during the reaction. The reaction was complete in 3½ hours. Yield from crystallization was 91.0 g.; M.P. 97°–98° C. An additional 6.0 g. were recovered by aspirating the mother liquor. Total yield: 97.0 g., or 82.5% of theoretical.

EXAMPLE VI

A third run was made using the general procedures of Examples IV and V, starting with 500 g. of the disulfide. This was suspended in 1200 ml. of carbon tetrachloride and 10 ml. pyridine in a 2-liter flask. 100 ml. of sulfuryl chloride was added and the solution was allowed to reflux. Additional portions of sulfuryl chloride were added, 40 ml. at a time, every hour, until 460 ml. had been added. Pyridine was added (5 ml. portions) every two hours until a total of 25 ml. had been added. The reaction was complete in about 9 hours. Yield from crystallization was 383 g.; M.P. 97°–98° C. An additional 70 g. were recovered from the mother liquor. Total yield: 453 g., or 76.8% of theoretical.

EXAMPLE VII

*Preparation of 2-nitro-4-chlorobenzenesulfenyl chloride*

In a 200 ml. round-bottomed, three-neck flask equipped with a thermometer and reflux condenser was placed 10 g. of bis-(2-nitro, 4-chlorophenyl) disulfide (melting with decomposition at 208–215° C.), 50 ml. of dry carbon tetrachloride, 8 ml. of redistilled sulfuryl chloride (boiling 68°–71° C.), and 1 ml. of pyridine (distilled from calcium hydride). Addition of the sulfuryl chloride caused the suspension to turn slightly brown. The mixture was maintained at 40–55° C. by intermittent use of a steam bath. Completion of the reaction (1 hour) was indicated by absence of the insoluble disulfide in the dark brown solution. Activated carbon was added and the mixture allowed to set for 15 minutes. This was filtered through filter aid and the flask and filter rinsed with 20 ml. of fresh carbon tetrachloride. The resulting yellow solution was aspirated to dryness giving dark yellow crystals (11.25 g., 95.0%); melting at 92–95° C. and giving no melting point depression with the 2-nitro, 4-chlorobenzenesulfenyl chloride prepared by the method of Zincke.

EXAMPLE VIII

*Preparation of 2-nitro-4-chlorobenzenesulfenyl chloride*

25 g. of bis-(2-nitro, 4-chlorophenyl) disulfide were suspended in 150 ml. of dry carbon tetrachloride and 3 ml. of pyridine in a 500 ml. flask fitted with a ball and socket stirrer, a thermometer and a reflux condenser. 15 ml. of redistilled sulfuryl chloride (B.P. 68°–70° C.) was added through the condenser and the temperature raised to 60° through use of a steam bath. The reaction was complete in about two hours as characterized by the disappearance of the disulfide into solution. Activated charcoal was added and the hot mixture was filtered through filter aid on a steam jacketed Büchner funnel. The solvent was aspirated until the product began to crystallize, at which point it was placed in the refrigerator overnight. The product was collected and dried in the vacuum desiccator. Yield: 21.0 g.; M.P. 95°–96° C. The mother liquor was aspirated to dryness and the resulting crystals collected. Yield: 7.7 g.; M.P. 92°–95° C. Total yield was 28.7 g., corresponding to 96.2% theoretical.

By similar procedures as above, using sulfuryl chloride as the chlorinating agent, and pyridine, also prepared were:

Benzenesulfenyl chloride (from both bis-p-phenyl disulfide and thiophenol);
p-Toluenesulfenyl chloride (from both bis-p-tolyl disulfide and p-thiocresol);
p-Chlorobenzenesulfenyl chloride (from both bis-p-chlorophenyl disulfide and p-chlorothiophenol);
m-Nitrobenzenesulfenyl chloride (from bis-m-nitrophenyl disulfide);

2-benzothiazolesulfenyl chloride (prepared in solution from the disulfide and also from 2-mercaptobenzothiazole); and Pentachlorobenzenesulfenyl chloride (from bis-pentachlorophenyl disulfide).

As can be seen by consideration of Example I above, it is possible to secure the products of this invention and to carry out the reaction without the presence of the pyridine catalyst. However, the reaction time under these circumstances is extended severalfold (from 30 minutes to 2 hours in the case of Example I) and accordingly the use of pyridine or a substituted pyridine is advantageous. The use of iodine as a catalyst also speeds the reaction somewhat (from the normal 3 hours to 2 hours as shown in Example I). However, a certain amount of product deterioration is observed where the contaminant iodine is present.

As the aryl substituents do not actually enter into the reaction, any aryl substituent may be bonded to the disulfide or thiol selected for chlorinolysis. Also, a mixture of products having differing aryl substituents on the sulfur atom may be obtained by the simple expedient of using mixtures of thiols or disulfides having differing aryl substituents or, alternatively, by selecting as a reactant a single disulfide having differing aryl substituents in the atom. As set out above, the aryl radicals may be either homocyclic or heterocyclic and unsubstituted, such as phenyl, naphthyl, pyridyl, pyrrolyl or thienyl or hydrogen atoms on these rings may be replaced with any of the usual substituent groups such as alkyl, halo, haloalkyl and nitro.

As is known, these sulfenyl halides are particularly useful since they may be readily converted into various derivatives, thereby providing a means for ready identification and syntheses of various organic compounds. Certain of the compounds which are obtained by the process of this invention are also of value as polymerization accelerators for certain materials—see U.S. Patent 2,769,777 to Birum et al. See also U.S. Patent No. 2,862,946 for a disclosure of means of converting the aryl sulfenyl chlorides to valuable sulfonates. Finally, the new compound of this invention, pentachlorobenzenesulfenyl chloride, is of particular value since it may be reacted with trimethyl phosphite to yield dimethyl S-pentachlorophenyl phosphorothiolate which, used as a fungicide, affords excellent control of bean powdery mildew, bean rust and northern leaf blight of corn. A specific example showing the conversion of pentachlorobenzenesulfenyl chloride to the fungicidal material follows:

EXAMPLE IX

Trimethyl phosphite, 7.4 g., was added dropwise to a solution of 10.6 g. pentachlorobenzenesulfenyl chloride in 100 ml. of ethylene chloride. After completion of the exothermic reaction, a solid product was isolated in good yield by aspirating off the solvent. The melting point of the crude product was 135°–142° C. Following recrystallization from hexane the melting point of the dimethyl S-pentachlorophenyl phosphorothiolate was again checked and found to be 132°–133° C.

Many modifictions and variations of the invention as hereinbefore set forth may be made without departing from the spirit and scope thereof and therefore only such limitations should be imposed as are indicated in the appended claims.

I claim:

1. A process for preparing compounds having the general formula ArSCl wherein Ar represents a member of the class consisting of phenyl, nitro-substituted phenyl, halo-substituted phenyl, lower alkyl-substituted phenyl and benzothiazoyl which comprises; placing sulfuryl chloride and a compound selected from the group consisting of aryl thiols and bis-aryl dithiols corresponding to the said ArSCl in solution in a solvent for both materials, adding thereto a catalytic quantity of a compound selected from the class consisting of pyridine and 2-methyl-5-ethyl pyridine and heating the reaction mixture so formed whereby to effect a reaction and produce the said ArSCl.

2. The process of claim 1 wherein one reactant is bis(2-nitrophenyl)disulfide and wherein the product is 2-nitrobenzenesulfenyl chloride.

3. The process of claim 1 wherein one reactant is pentachlorobenzenethiol and wherein the product is pentachlorobenzenesulfenyl chloride.

4. The process of claim 1 wherein one reactant is bis(2,4-dinitrophenyl)disulfide and wherein the product is 2 4-dinitrobenzenesulfenyl chloride.

5. The process of claim 1 wherein one reactant is bis(2-nitro-4-chlorophenyl)disulfide and wherein the product is 2-nitro-4-chlorobenzenesulfenyl chloride.

6. The process of claim 1 wherein one reactant is bis(p-phenyl)disulfide and wherein the product is benzenesulfenyl chloride.

7. The process of claim 1 wherein one reactant is thiophenol and wherein the product is benzenesulfenyl chloride.

8. The process of claim 1 wherein one reactant is bis(p-tolyl)disulfide and wherein the product is p-toluenesulfenyl chloride.

9. The process of claim 1 wherein one reactant is p-thiocresol and wherein the product is p-toluenesulfenyl chloride.

10. The process of claim 1 wherein one reactant is bis(p-chlorophenyl)disulfide and wherein the product is p-chlorobenzenesulfenyl chloride.

11. The process of claim 1 wherein one reactant is p-chlorothiophenol and wherein the product is p-chlorobenzenesulfenyl chloride.

12. The process of claim 1 wherein one reactant is bis(2-benzothiazole)disulfide and wherein the product is 2-benzothiazolesulfenyl chloride.

13. The process of claim 1 wherein one reactant is 2-mercaptobenzothiazole and wherein the product is 2-benzothiazolesulfenyl chloride.

14. The process of claim 1 wherein one reactants is bis(pentachlorophenyl)disulfide and wherein the product is pentachlorobenzenesulfenyl chloride.

References Cited in the file of this patent

UNITED STATES PATENTS

| | | |
|---|---|---|
| 2,469,697 | Moon | May 10, 1949 |
| 2,503,486 | Himel | Apr. 11, 1950 |
| 2,711,383 | Ruggeri et al. | June 21, 1955 |
| 2,774,707 | Birum | Dec. 18, 1956 |
| 2,809,997 | Johnson | Oct. 15, 1957 |

FOREIGN PATENTS

| | | |
|---|---|---|
| 423,232 | Germany | Dec. 29, 1925 |

OTHER REFERENCES

Gebauer-Fulnegg: J. Am. Chem. Soc., vol. 49, pp. 2270–5 (1927).

Behaghet: Berichte, vol. 66, p. 708–109 (1933).

Elliot et al.: J. Chem. Soc., vol. 1940, pp. 641–9.

Rege et al.: Chem. Abstracts, vol. 43, col. 2599 (1949).

Brintzinger et al.: Chem. Ber., vol. 85, pp. 455–7 (1952).

Brintzinger et al.: Chem. Ber., vol. 86, pp. 557–63 (1953).

Brintzinger et al.: Chem. Ber., vol. 83, pp. 87–90 (1950).